Figure 4:
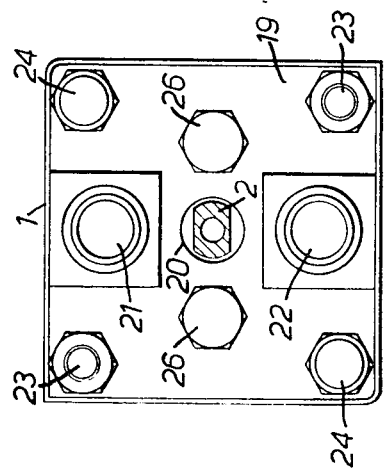
Figure 5:
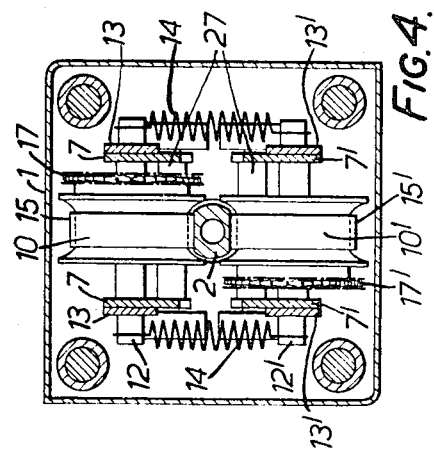

United States Patent

[11] 3,632,031

[72] Inventors John R. Gurner;
 Leslie A. Henman, both of Ilford, England
[21] Appl. No. 9,384
[22] Filed Feb. 6, 1970
[45] Patented Jan. 4, 1972
[73] Assignee The Plessey Company Limited
 Ilford, England
[32] Priority Feb. 7, 1969
[33] Great Britain
[31] 6,892/69

[54] ACTUATOR MECHANISM
 11 Claims, 6 Drawing Figs.
[52] U.S. Cl..................................... 226/187,
 226/188, 226/189, 226/190
[51] Int. Cl........................................ B65h 17/20
[50] Field of Search........................................ 226/108,
 112, 117, 181, 188, 187, 190, 191, 189

[56] References Cited
UNITED STATES PATENTS
1,224,046 4/1917 Turley........................ 226/108
3,462,058 8/1969 Redman..................... 226/191

Primary Examiner—Richard A. Schacher
Assistant Examiner—Gene A. Church
Attorney—Scrivener, Parker, Scrivener & Clarke ABSTRACT: An actuator mechanism comprising a pair of opposed rollers between which an elongate member is fed, each of the rollers being provided with a friction band extending over at least part of its circumference contact between each roller and said member being made through the respective friction band, with at least one of said rollers being caused to be rotated to effect longitudinal movement of the elongate member.

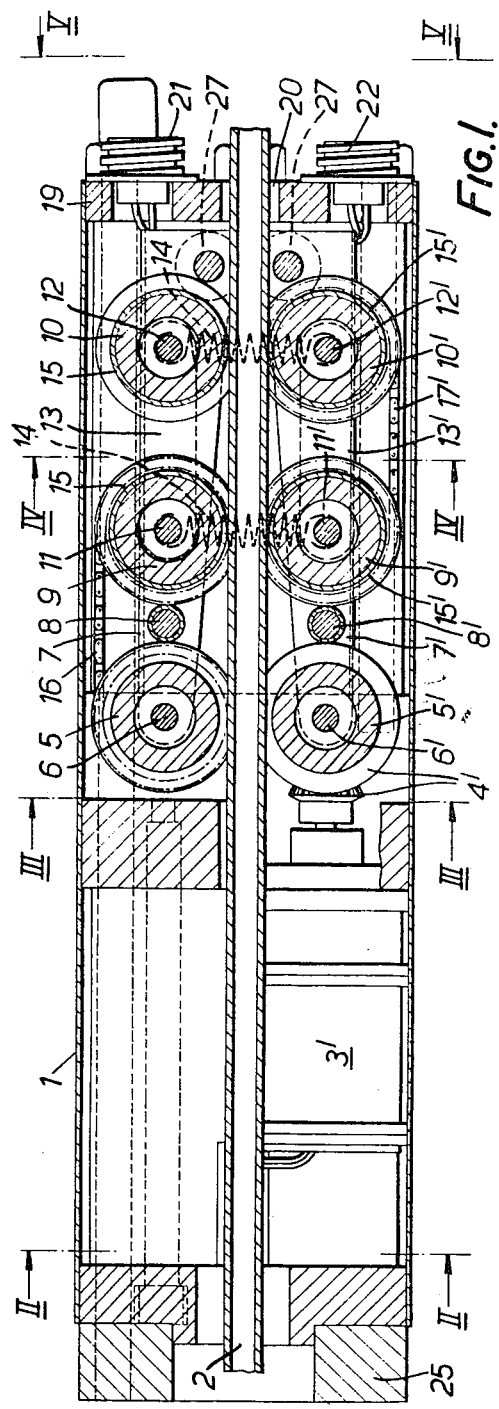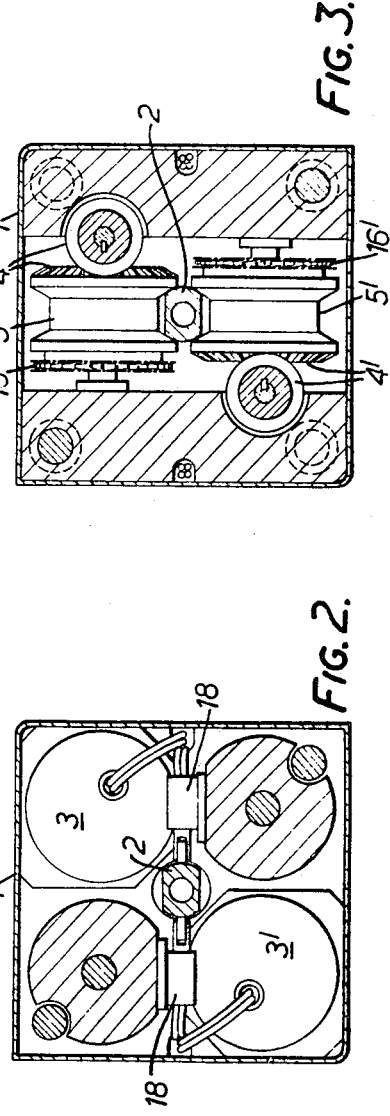

ACTUATOR MECHANISM

This invention relates to actuator mechanisms. It relates specifically to an actuator mechanism which is capable of operating in a linear fashion for example to enable a rod or tube to be pushed or pulled in a longitudinal direction.

According to the present invention there is provided an actuator mechanism for producing longitudinal movement of an elongate member, comprising at least two rollers positioned on each of two opposite sides of said member, each of said rollers being provided with a friction band extending over at least part of its circumference, through which band it contacts said member, the rollers on each side of the elongate member being interconnected by common driving means for causing said rollers to be rotated, thereby to effect longitudinal movement of the elongate member.

In carrying out the invention spring means may be provided for urging the rollers on opposite sides of the elongate member together, and a drive roller may be associated with the rollers on each side of the elongate member, with motor means for causing said drive rollers to be rotated.

In one preferred arrangement the two rollers on each side of the elongate member will be provided with a circumferential friction band, and each drive roller will be effective for driving one of the rollers with which it is associated, the said one of said rollers being effective for driving the other of the two rollers with which it is associated. Conveniently the drive between rollers may take the form of a chain drive.

In another preferred arrangement for carrying out the invention, the rollers on each side of the elongate member will be interconnected by means of an endless, toothed belt, teeth of said belt engaging with corresponding teeth of said rollers, the part of the belt in contact with each roller forming the friction band with which it contacts said member.

In one arrangement the rollers on each side of the elongate member excepting the drive roller may be carried by respective roller assemblies, each roller assembly being supported by a swinging arm pivotally mounted at the axis of the corresponding drive roller.

In order to facilitate initial insertion of the rod between the rollers of the actuator mechanism, drive release means may be provided for causing the rollers on each roller assembly to be prised apart. Conveniently the drive release means may comprise roller means attached to each of the swinging arms, with screw means located in an end plate of said mechanism for causing the roller means on each of the swinging arms to be forced apart.

Conveniently each of the rollers may be provided with a circumferential groove for locating and guiding the elongate member which may take the form of a rod or tube.

Advantageously microswitch means may be provided operable in conjunction with the elongate member for determining the longitudinal position thereof relative to said actuator.

Figure 6:
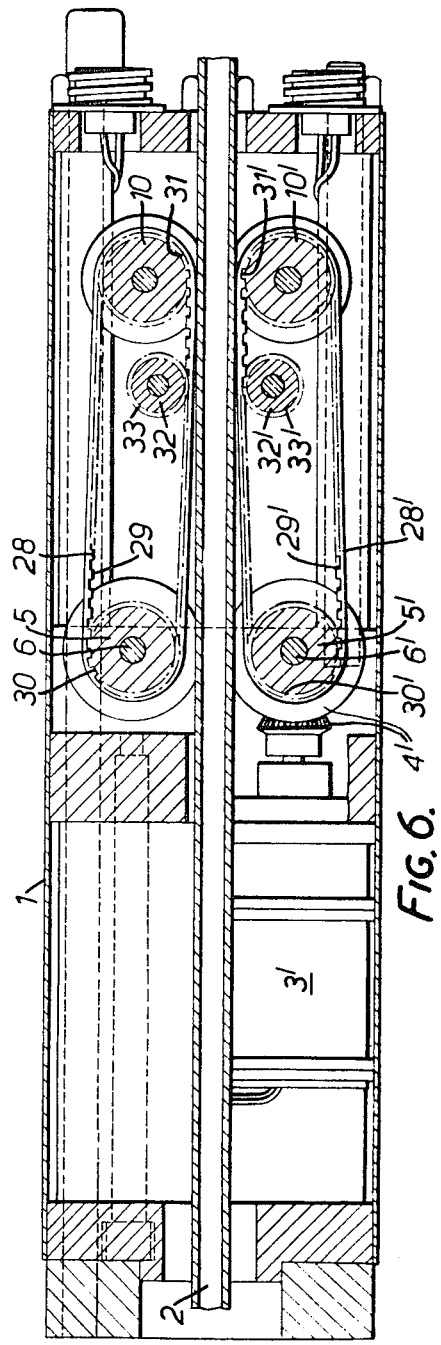

By way of example, embodiments of the invention will be further described with reference to the accompanying drawings, in which FIG. 1 shows an axial cross-sectional view through an actuator mechanism according to the invention;

FIGS. 2 to 5 are cross-sectional views along the lines II, III, IV and V respectively of FIG. 1; and FIG. 6 shows a modification of the actuator mechanism of FIG. 1.

As shown particularly in FIG. 1 of the drawings, the actuator mechanism comprises a housing 1 through the center of which a rod or tube 2 is passed. The rod 2 is not limited as to its length and may be fed in either direction by operation of the actuator mechanism to enable, for example mechanical movements to be effected at some distance from the actuator.

Located within the housing 1 are two opposed driving arrangements which cooperate with diametrically opposed flat surfaces of the rod 2 to cause it to be moved longitudinally. For the sake of convenience only one of the driving arrangements will be described in detail, but corresponding parts of the other arrangement will be given the same reference numerals with a differentiating dash (').

Considering the driving arrangement positioned above the rod 2 in FIG. 1 of the drawings, this consists of a motor 3 (FIG. 2) which through bevelled gears 4 drives a roller 5, the roller 5 being rotatably mounted in the casing 1 by means of a shaft 6. Also freely mounted on the shaft 6 are a pair of generally triangular-shaped plates 7 which are spaced apart by means of a tie bolt 8. The pair of plates 7 are thus allowed to pivot about the shaft 6. Mounted on the two plates 7 is a roller assembly which consists of two further rollers 9 and 10 which are rotatably mounted on shafts 11 and 12 respectively, the shafts 11 and 12 being supported by a linking plate 13. The shafts 11 and 12 also extend through holes in the plates 7 and the roller assembly is given a floating action by arranging that the hole in the plate 7 through which the shaft 12 extends is just sufficient to allow relative rotational movement between the shaft 12 and the plate 7, while the hole in the plate 7 through which the shaft 11 extends is arranged to be enlarged so that in its normal operating position the shaft 11 does not contact the plate 7. The rollers 9,9' and 10, 10' of the two driving arrangements are urged together by means of two pairs of springs 14 acting on the shaft 11, 11' and 12, 12' respectively so that the rod 2 is clamped between corresponding rollers of the two arrangements. As can be seen from FIGS. 3 and 4 of the drawings, each of the rollers 5, 9 and 10 are provided with a circumferential flat-bottomed trough or groove, the walls of each of which act as guides for the rod 2, the bottom of each groove in rollers 9 and 10, due to the springs 13 and 14 respectively, also making contact with the rod 2. In order to provide a good frictional contact between the rollers 9 and 10 and the rod 2, each of the rollers 9 and 10 are provided with a friction band 15, typically consisting of a layer of "VITON" material, covering the bottom of each groove. By using such a material the temperature of the rod 2 may be increased to around 250° C. without undue effect.

In order to cause the rod 2 to be moved longitudinally, the rollers 9 and 10 (and the corresponding rollers 9' and 10') are caused to be rotated, roller 9 being driven from roller 5 by means of a chain drive 16 located on one side of the rollers and roller 10 being driven from roller 9 by means of a chain drive 17 located on the other side of the rollers. Thus by causing the motor 3 to be actuated, the rollers 5, 9 and 10 are caused to be rotated, and the rod 2 is moved in a longitudinal direction, the actual direction being dependent upon the direction of rotation of the motor 3.

Mounted on supports within the housing 1 there are provided two microswitches 18 (FIG. 2) each of which has a spring loaded operating plunger which contact opposite sides of the rod 2. By means of notches in the side of the rod 2, the microswitches 18 may provide an indication of the position of the rod with respect to the actuator. For example, one microswitch 18 may give an indication of an intermediate position of the rod 2 while the microswitch 18 may provide a stop signal for the rod when it reaches the end of its permitted length of travel in each direction.

The housing 1 is provided at its right hand end as viewed in FIG. 1 with an end plate 19 through a center hole 20 of which extends the rod 2. The end plate 19 is provided with two electrical connectors 21 and 22, connector 21, for example for making the electrical connections to the electric motors 3, 3' and connector 22, for example for making electrical connection to the microswitches 18. The end plate is also provided with two fixing bolts 23 which are used to clamp the various parts of the actuator together and two further bolts 24 are provided for clamping the actuator to a supporting flange 25 (FIG. 1).

In order to initially feed the rod 2 between the rollers 9, 9' and 10, 10', it is necessary to force them apart against the pressure of the two pairs of springs 14. This is achieved by means of two bolts 26 located in the end plate 19, the ends of which bolts are arranged to be pointed and act on drive release rollers 27 mounted on plates 7 and 7', the drive release rollers 27 also acting as spacers for the plates 7 and 7'. Thus by screwing the bolts 26 inwards, the rollers 27 are prised apart, so causing the rollers 10, 10' which are accurately mounted in the plates 7 and 7' respectively to be moved apart. However since the shafts 11 and 11' carrying the rollers 9 and 9' respectively are mounted in enlarged holes in the plates 7 and 7' respectively, these will not move until the tolerance in the respective holes is first taken up. When this happens the rollers 9 and 9' will also be moved apart so allowing the rod 2 to be fed through the actuator.

When the rod 2 is passed through the housing 1 and the actuator mechanism assembled as shown in FIG. 1, the rod 2 may be caused to be driven to the right or to the left by suitably actuation of both electric motors 3 and 3' within the housing. With continuous actuation in one direction the rod 2 will be driven to an extreme position at either side and when this position has been reached the indexing mechanism comprising the notch in the rod 2 and the spring loaded microswitch plunger will cause the microswitch 18 to operate. Operation of this switch will cause the motor circuit to be interrupted so that any likelihood of damage to the actuator mechanism or rod will be avoided.

In FIG. 6 of the drawings, there is shown a modification of the actuator mechanism just described in which the need for a chain drive between corresponding rollers is obviated. For the sake of convenience only those parts that differ from the arrangement of FIG. 1 will be described. In the arrangement of FIG. 6, an endless belt 28 is provided which extends around the rollers 5 and 10, the belt 28 being provided with teeth 29 on its inner surface which engage with teeth 30 and 31 on the rollers 5 and 10 respectively. The belt 28 now makes contact with the rod 2, so obviating the need for the individual friction bands 15 of the arrangement of FIG. 1. The roller 9 of the actuator mechanism of FIG. 1 is now replaced by a jockey pulley 32 of smaller diameter which is also provided with teeth 33 which engage the teeth 29 of the endless belt 28. The roller 10 and jockey pulley 32 are mounted on a roller assembly as in the arrangement of FIG. 1 and spring pressure is applied between the roller assemblies of the upper and lower driving arrangements by means of springs (not shown) as in the arrangement of FIG. 1.

The fact that endless toothed belts made of material suitable for use at high temperatures e.g., in the order of 200° to 250° C. are not obtainable may limit the use of the arrangement of FIG. 6 to comparatively low temperature applications.

One practical application in which use of an actuator mechanism of the type hereinbefore described has been proposed is for the insertion and withdrawal of a detector used for neutron flux monitoring of a boiling water reactor. In this application space for mounting the actuator is restricted to that available in the small gap between control rod drive units and accessibility to this space is from the bottom only. One feature of the actuator mechanism of the invention is that it may be constructed with an extremely compact profile and with all mounting requirements provided on the end plate 13 at the right-hand side of the device. The actuator mechanism is thus capable of being mounted in a very restricted space.

The foregoing description of an embodiment of the invention has been given by way of example only and a number of different modifications may be made without departing from the scope of the invention. For example if it was required to provide increased mechanical thrust to the rod the number of springs urging the rollers together may be increased or alternatively the number of driving motors and/or rollers within the housing could be increased.

What we claim is:

1. An actuator mechanism comprising two pivoted arm members the pivotal axes of which are disposed parallel to one another, said members being spaced apart in a direction perpendicular to the direction of said pivotal axes, two opposed roller assemblies each comprising two rollers between which roller assemblies an elongate member to be moved is adapted to be positioned, one roller assembly being carried by each pivoted arm member, a friction band extending over at least part of the circumference of each roller, through which band each roller is adapted to make contact with the elongate member, spring means for causing corresponding rollers of each roller assembly to be urged together, and drive means for causing each of said rollers to be rotated thereby to effect longitudinal movement of said member.

2. An actuator mechanism according to claim 1, comprising a drive roller associated with each roller assembly and motor means for causing said drive rollers to be rotated.

3. An actuator mechanism according to claim 2, in which each drive roller is rotatable about the pivotal axis of the arm member carrying the roller assembly with which it is associated.

4. An actuator mechanism according to claim 3, in which each of the rollers of the two roller assemblies is provided with a circumferential friction band, and in which each drive roller is effective for driving one of the rollers with which it is associated, the said one of the rollers being effective for driving the other of the rollers with which it is associated.

5. An actuator mechanism according to claim 4, in which the drive between rollers takes the form of a chain drive.

6. An actuator mechanism according to claim 3, in which each of the rollers is provided with a number of transverse grooves around its circumference and in which the rollers of each roller assembly and the drive roller associated therewith are interconnected by means of an endless toothed belt, teeth of said belt engaging with said grooves in said rollers, the part of the belt in contact with each roller forming the friction band by means of which it is adapted to contact the elongate member.

7. An actuator mechanism according to claim 1, comprising drive release means for causing corresponding rollers of each roller assembly to be prised apart to facilitate initial insertion of the elongate member.

8. An actuator mechanism according to claim 7, in which the drive release means comprises a further roller attached to each of the pivoted arm members, and screw means located in an end plate of said mechanism for causing the further rollers to be forced apart.

9. An actuator mechanism according to claim 1, in which each of the rollers of the two roller assemblies is provided with a circumferential groove for locating and guiding the elongate member.

10. An actuator mechanism according to claim 1, in which the elongate member takes the form of a rod or tube.

11. An actuator mechanism according to claim 1, comprising microswitch means operable in conjunction with the elongate member for determining the longitudinal position thereof relative to said actuator mechanism.

* * * * *